Nov. 17, 1970     L. THÉVÉNAZ     3,540,803
FILM RECEPTOR FOR A MOTION-PICTURE PROJECTOR FOR REWINDING
ONE FILM DURING PROJECTION OF A SECOND FILM
Filed July 10, 1968     2 Sheets-Sheet 1
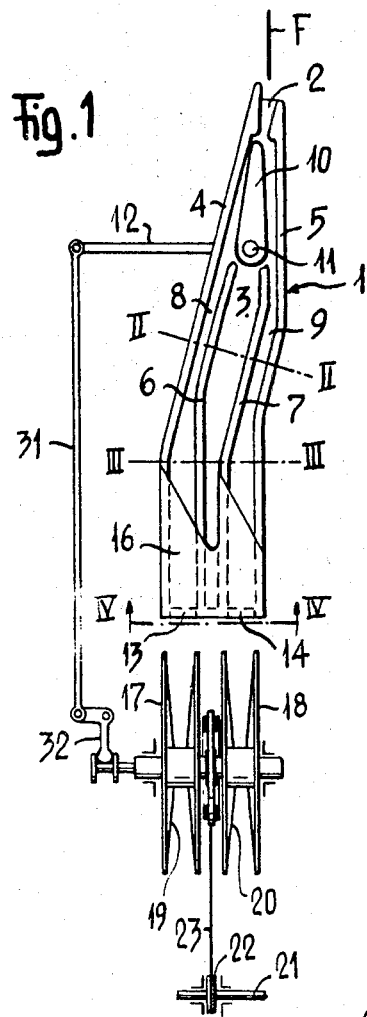
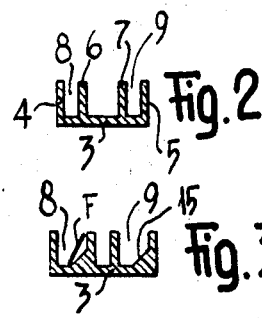
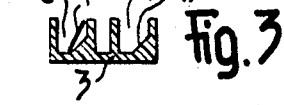
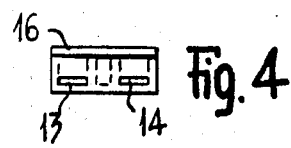
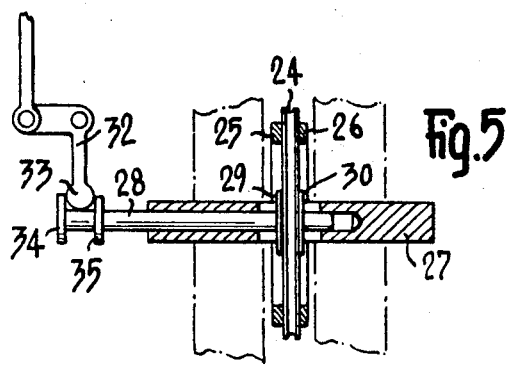
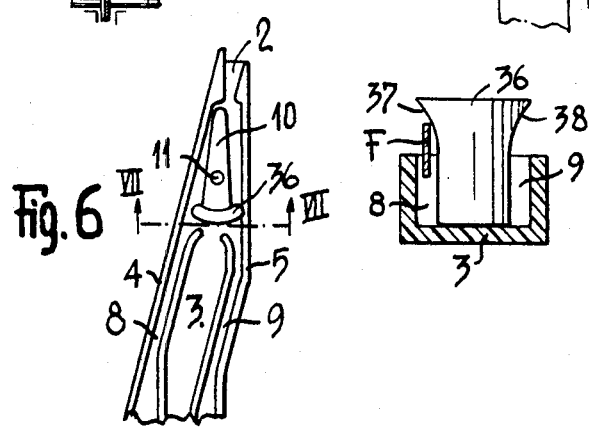
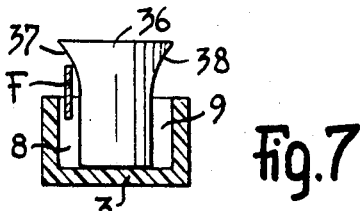

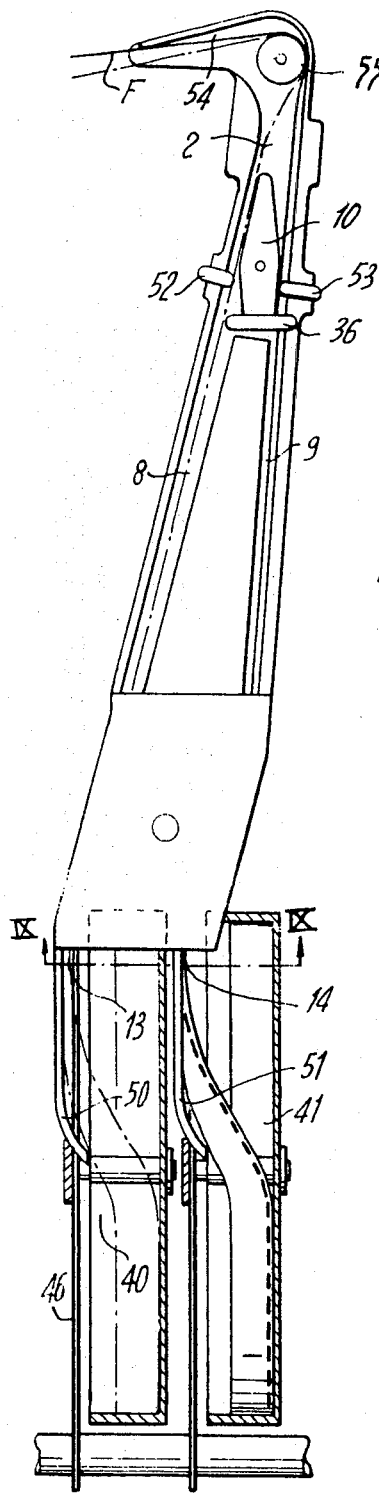
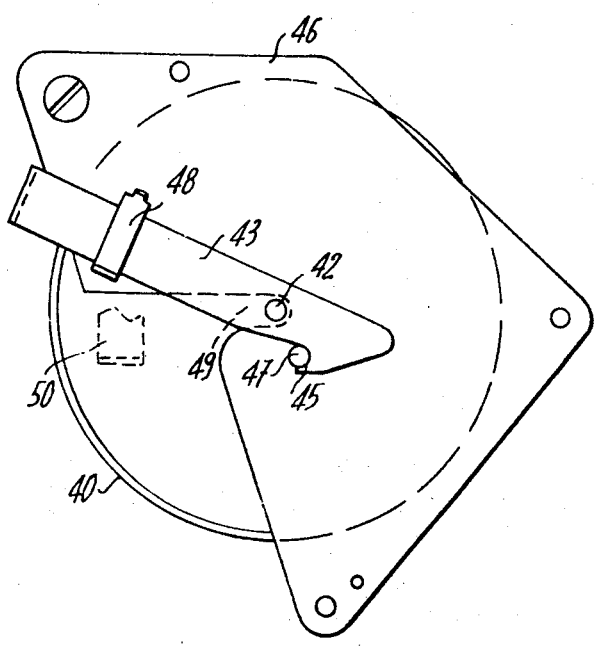
FIG. 8
FIG. 9

United States Patent Office 3,540,803
Patented Nov. 17, 1970

1

3,540,803
FILM RECEPTOR FOR A MOTION-PICTURE PROJECTOR FOR REWINDING ONE FILM DURING PROJECTION OF A SECOND FILM
Louis Thévenaz, Les Rasses, near Sainte-Croix, Vaud, Switzerland, assignor to Paillard S.A., Sainte-Croix, Vaud, Switzerland, a company of Switzerland
Filed July 10, 1968, Ser. No. 743,849
Claims priority, application Switzerland, July 18, 1967, 10,228/67
Int. Cl. G03b 23/00
U.S. Cl. 352—125                                   10 Claims

ABSTRACT OF THE DISCLOSURE

In a motion picture projector for rewinding one film during the projection of another a receptor is provided for guiding the film strips between the exit from the projector and the takeup reel. The receptor has a single entrance and two exits. Inside the entrance a deflector is provided for guiding the entering film strip to one or the other of two paths leading from the entrance to the exits. Each path is open on one side a portion of its length so that the film may be removed edgewise. Also each path has a contour for twisting the film through an angle of approximately 90° to align it with the takeup reel.

BACKGROUND OF THE INVENTION

The invention relates to a film receptor for a motion-picture projector, for permitting one film to be projected while another, just projected, is rewound off of the take up reel.

It has previously been suggested that some projectors be loaded with several reels of film, which are then successively projected. In order to avoid having to interrupt the projection while the film just projected is rewound, or while all of the films projected are successively rewound at the end of a performance, means have been provided for enabling each film just projected to be rewound during the projection of the following reel of film. This scheme requires a film receptor having two take up means, such as reels, which simultaneously permit the film being projected to be wound up on the take up reel, while the other film, just projected, is rewound for reprojection. The manufacture of these film receptors is usually very expensive.

SUMMARY OF THE INVENTION

The purpose of the present invention is to provide a film receptor of the type previously described, but the construction of which is relatively simple. The film receptor of the invention includes a compound passageway having a single film entrance and two film exits, movable deflector means for guiding the film passing through the entrance to one of the exits, which guides the film to a respective one of two take up means. At least a part of one side of the passageway is open in order to permit a film just projected to be moved sideways out of the passageway for rewinding while the next film to be projected is guided by the passageway to that take up means which is empty.

BRIEF DESCRIPTION OF THE DRAWINGS

The invention will be described, with reference to the figures of the drawings, wherein:
FIG. 1 is a side view of one embodiment of the invention;
FIGS. 2 and 3 are views in section respectively taken along lines II—II and III—III of FIG. 1;
FIG. 4 is a bottom view taken along line IV—IV of FIG. 1;

2

FIG. 5 is a detail view, partly in section, on expanded scale of a part of the film receptor shown in FIG. 1;
FIG. 6 is a side view of the top part of a second embodiment of the invention;
FIG. 7 is a view in section taken along line VII—VII of FIG. 6;
FIG. 8 is a side view, partly in section, of a third embodiment of the invention; and
FIG. 9 is a side view of a take up drum and mount for the embodiment shown in FIG. 8.

DESCRIPTION OF THE PREFERRED EMBODIMENTS

The film receptor of the invention shown in FIG. 1 has a molded or cast compound passageway 1 incorporating an entrance 2 for a film F, of which only the lower end is shown in FIG. 1.

The passageway consists chiefly of a side wall 3 and two end walls 4 and 5 projecting perpendicularly from the edges of the wall 3, and which progressively diverge as they approach the lower end of the passageway. The side wall 3 further carries two walls 6 and 7 located opposite the end walls 4 and 5 so as to form two passages 8 and 9.

Immediately adjacent the entrance 2 is located a deflector 10, mounted on a pivot 11 in the wall 3, which pivot is rigidly connected to an arm 12. Depending on the position of the deflector, a film is directed towards the passage 9 (as shown in FIG. 1) or towards the passage 8, if the deflector is pivoted against the wall 5.

The passages 8 and 9, as well as the entrance 2, are defined by walls perpendicular to the wall 3, the passages being open on the side opposite the wall 3, as shown in FIG. 2.

The two passages lead, remote from the deflector, to two exit slits 13 and 14. The plane of the film issuing from the exit slit 13 or 14 is substantially perpendicular to that of the film passing through the entrance 2. Each passage 8 or 9 has a longitudinal twist, which is so shaped as to facilitate the film to twist in the passage. To this end, the side wall 3 incorporates an inclined surface 15 for each passage, as shown in FIG. 3. The position taken by the film F at the height of the sectional line III—III is shown, for the passage 8, in FIG. 3.

The passages 8 and 9 are covered near the exit slits 13 and 14 by a plate 16, which also embodies an inclined surface for each passage, so that the film is progressively twisted into the plane of the one or the other exit slit.

The exit slits 13 and 14 are positioned near two take up reels 17 and 18, which are coaxially mounted side by side and respectively aligned in the path of the film issuing from the exit slit 13 or 14. These reels are of the type that automatically secure the film by means of elastic elements 19 and 20, respectively, positioned against the interior face of the reel flanges.

The one or the other reel is rotated by means of a spindle 21 through a pulley 22 and belt 23 driving a disc 24 carrying a friction coupler 25 and 26, respectively, on each of its faces. The disc turns freely on a shaft 27 carrying the two reels 17 and 18. The disc can be shifted sideways, so that one or the other of the friction couplers 25 and 26 bears against the outer face of a reel flange. The lateral movements of the disc are controlled by a stem 28 sliding within the shaft 27 and carrying two transverse flanges 29 and 30, located on respective sides of the disc 24. The stem 28 is shifted at the same time that the deflector 10 is pivoted, because the latter is connected to the stem by means of the arm 12, a connecting rod 31, and a lever 32, the lower end 33 of which engages between two flanges 34 and 35 of the stem 28.

When the drive mechanism of the projector moves the film towards the entrance 2, the film is guided by the deflector 10 and one or the other of the passages 8 and 9 towards that one of the take up reels 17 and 18 which is empty. At the same time this reel is rotated by the disc 24, so that the film is wound onto the reel.

When the film has been projected, the projector is stopped while the film is still secured to the hub of the feed reel, which is subsequently moved sideways, so that the film F leaves the passage 8 or 9 through its open side. Usually, this movement of the feed reel, which held the film just projected, is accompanied by a corresponding movement of a reel holding the film next to be projected, so that the film of this latter reel is engaged by the projector's drive mechanism and moved to a position opposite the entrance 2. When changing reels of film, the positions of the deflector 10 and the disc 24 change, whereby the film of the new reel is guided to the empty take up reel, whereas the reel just loaded can be unwound to rewind the film just projected back onto its original reel.

In the second embodiment illustrated in FIGS. 6 and 7, the deflector 10 is not connected by an arm 12 to a drive linkage, but instead embodies an expansion 36 positioned below the pivot 11.

As shown in FIG. 7, the expansion has two curved or inclined surfaces 37 and 38 which respectively project above the passages 8 and 9. Thus, when the film F is moved laterally, as explained above, to permit its being rewound and the admission of the next film into the passageway, the film moved comes to bear against the inclined surface 37 or 38, as the case may be, causing the deflector 10 to pivot into the position in which the film from the fresh reel is deflected towards the empty passage. Therefore, each time that a film is moved sideways to leave its passage, it presses on that side of the expansion 36 so as to cause the deflector 10 to pivot into that position which guides the fresh film into the other passage.

In a variation of this embodiment, the two take up reels 17 and 18 can be rotated continuously through a friction coupling having such a low drive torque that the completely projected reel of film can be rewound against the force of the drive.

The embodiment illustrated in FIGS. 8 and 9 differs from that of FIGS. 1 to 5 in that the passages 8 and 9 do not twist the film between the entrance 2 and the exits 13 and 14.

The two take up reels 17 and 18 are replaced by two open drums 40 and 41 into which the film can be introduced.

As shown for one drum in FIG. 9, each drum turns freely on a pivot 42 which carries an arm 43 incorporating a nose 45. The arm serves to connect the pivot 42 to a support plate 46. In the position shown in FIG. 9, the arm nose 45 cooperates with a pin 47 fixed to the plate 46, the arm 43 being held in position by a springy foot 48 mounted on the upper part of the plate 46.

The arm 43 can be freed from the foot 48 by turning the former counterclockwise, as seen in FIG. 9, the nose 45 thus being moved away from the pin 47. It is then possible to remove the drum 40 by pulling on the arm 43, causing the pivot 42 to slide along a slot 49 in the plate 46. Thus, it is easy to remove either drum in case of necessity, as when a film breaks, for example.

Projecting from each exit 13 and 14 is a respective guide 50 and 51, of which the lower end is curved to guide the film towards the bottom of the respective drum. The lower end of the guide 50 is shown in dashed line in FIG. 9. It is apparent from this figure and FIG. 8 that the path of the film towards the drum bottom is virtually tangential to the drum periphery. When an end of the film enters the drum it contacts the bottom and interior cylindrical wall surface of the drum and causes the latter to rotate. The result of this cooperation between the drum and the film is that the latter automatically twists itself sufficiently so that it lies snugly against the interior surface of the cylindrical wall of the drum and forms within the latter a winding of contiguous spirals supported by the cylindrical wall.

In this embodiment, as in that shown in FIGS. 6 and 7, the deflector 10 has a bottom expansion 36. The effectiveness with which the deflector is operated by a film as it is removed from a passage 8 or 9 is further improved by two flares or inclined surfaces 52 and 53, the curves or slopes of which are opposite to those of the curved or inclined surfaces 37 and 38. This construction obviates any possibility that a film can be removed from its passage without simultaneously pivoting the deflector 10 into that position in which the film from the new reel is deflected into the other passage.

In this embodiment of the film receptor of the invention the entrance 2 is preceded by an elongated mouth or deflector 54, which houses a rubber surface guide roller 55, which engages the end of the film leaving the film chamber of the projector and thereby positively ensures that the film end goes into the entrance 2.

Although the preferred embodiments of the invention have been described, the scope of, and the breadth of proection afforded to, the invention is limited solely by the appended claims.

I claim:

1. In a motion-picture projector a film receptor having two film take up means for winding up a reel of film that is being projected while simultaneously permitting the rewinding of a reel of film that has just been projected, wherein the improvement comprises a compound passageway for the film leaving the film chamber of the projector; a single film entrance in said passageway; two film exits in said passageway spaced from said entrance thereof; deflecting means movably mounted in said passageway between said film entrance and two film exits thereof for guiding the film passing through said film entrance to one or the other of said film exits, depending on the position of said deflecting means, each said exit guiding the film to a respective one of said two film take up means; and said passageway is open along at least part of one of its sides so as to permit the film which has just been projected to be shifted sideways out of said passageway for rewinding while the next film to be projected is guided by said passageway to that one of said take up means which is empty.

2. The film receptor as defined in claim 1, wherein said passageway is completely open along one of its sides from where the film enters said passageway to a location between where the film enters and said film exits, and wherein sideways movement of the feed reel of the film causes the latter to be moved out of said passageway along the entire open part thereof and to free said film entrance for the introduction of the next film to be projected.

3. The film receptor as defined in claim 1, wherein said passageway comprises two separate longitudinal passages leading to respective ones of said two film exits and communicating with said film entrance, each said passage starting at a position spaced downstream from said film entrance, and said deflecting means is positioned between said film entrance and said two passages to guide the film being projected into one or the other of said passages, and wherein each said passage embodies a longitudinal twist, whereby the plane of the film leaving a said film exit is substantially perpendicular to that of the same length of film passing through said film entrance.

4. The film receptor as defined in claim 3, wherein said two film take up means comprise two film take up reels, and means for mounting said reels coaxially, side by side, and in the path of a film leaving a respective one of said film exits.

5. The film receptor as defined in claim 4, including drive means for rotating one or the other of said two take up reels, control means for operating said deflecting means, and means for connecting said control and drive means together for causing that take up reel to be rotated which is associated with that said passage into which said deflecting means guides the film which is projected.

6. The film receptor as defined in claim 5, wherein said passageway comprises two separate longitudinal passages leading to respective ones of said two film exits and communicating with said film entrance, each of said passages starting at position spaced downstream from said film entrance, and said deflecting means is positioned between said film entrance and said two passages to guide the film being projected into one or the other of said passages, and wherein a film moved sideways is moved out of its passage, and including an expansion incorporated in said deflecting means and projecting outwardly above each said passage in a plane perpendicular thereto for being pressed upon by a film when the latter is moved sideways out of its passage to cause said deflecting means to be moved into that position thereof which guides a film to be projected into the other of said two passages.

7. The film receptor as defined in claim 6, wherein said two film take up means comprise two open drums, each incorporating a cylindrical side wall and a bottom, and each said film exit being so positioned relative to a respective said drum that the plane of the film issuing from an exit is substantially parallel to the bottom of the drum.

8. The film receptor as defined in claim 7, including means for mounting said drums free to rotate in a perpendicular plane about their axes, and means associated with each said film exit for so guiding the film towards the bottom of the respective drum that the film twists through an angle of substantially 90° and the starting end thereof is laid snugly against the cylindrical side wall of the drum.

9. The film receptor as defined in claim 6, including means associated with said passageway for deflecting a film when moved sideways against said deflecting means expansion.

10. The film receptor as defined in claim 1, wherein the at least partly open side is substantially perpendicular to the plane of the film entering said passageway.

References Cited
UNITED STATES PATENTS

| | | | |
|---|---|---|---|
| 1,245,755 | 11/1917 | Mehlfelder | 352—125 |
| 1,253,372 | 1/1918 | Gotti | 352—125 |
| 3,458,148 | 7/1969 | Neumeister | 352—125 X |

NORTON ANSHER, Primary Examiner

M. H. HAYES, Assistant Examiner